Figure 1:
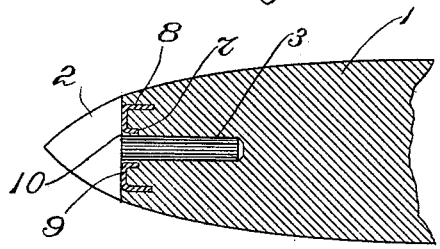

No. 639,896. Patented Dec. 26, 1899.
S. M. HAMBLIN.
LOOM SHUTTLE.
(Application filed Aug. 7, 1899.)

(No Model.)

Witnesses:
Oscar F. Hill
Edith J. Anderson.

Inventor:
Stephen M. Hamblin
by Macleod Calver Randall
Attorneys.

UNITED STATES PATENT OFFICE.

STEPHEN M. HAMBLIN, OF CENTRAL FALLS, RHODE ISLAND, ASSIGNOR TO THE NEW SHUTTLE COMPANY, OF PAWTUCKET, RHODE ISLAND.

LOOM-SHUTTLE.

SPECIFICATION forming part of Letters Patent No. 639,896, dated December 26, 1899.

Application filed August 7, 1899. Serial No. 726,376. (No model.)

*To all whom it may concern:*

Be it known that I, STEPHEN M. HAMBLIN, a citizen of the United States, residing at Central Falls, in the county of Providence and State of Rhode Island, have invented certain new and useful Improvements in Loom-Shuttles, of which the following is a specification, reference being had therein to the accompanying drawings.

As is well understood, the extremities of shuttles that are employed in looms for weaving are reduced in diameter and tapered for the purpose of facilitating the passage of the shuttle through the shed in the warps and into the shuttle-boxes. The usual practice is to provide the shuttle with a conical metal tip at each extremity, such tip being mounted upon a stem that enters an axial socket bored in the shuttle-body. In some cases in order to prevent the wood of which the shuttle-body is composed from becoming split around the socket that receives the stem of the tip, either in the operation of applying the tip or in consequence of the hard usage to which the shuttle is subjected while in use, a reinforce in the form of a reinforcing-ring of malleable iron has been embedded in the end of the shuttle-body concentrically with the socket which receives the stem of the tip. Such reinforcing-rings, however, frequently burst under the strain to which they are subjected in the operation of driving the stem of the tip home in the socket and afterward.

My invention has for its main object to provide a stronger and more efficient and reliable form of reinforce.

The invention consists in the combination, with the shuttle-body and a metallic tip having a stem received by a socket in the said shuttle-body, of a reinforcing-ring characterized by having inner and outer concentric flanges or cylindrical parts and an intermediate or connecting annular portion, the two flanges or cylindrical parts extending in one and the same direction from the annulus and entering two annular grooves formed in the end of the shuttle-body concentric with the axial socket which receives the stem of the tip, the said grooves respectively matching in diameter and depth the two flange portions of my reinforcing-ring. Having prepared the shuttle-body by forming the central or axial socket and concentric grooves, I introduce the flanges of the ring into the concentric grooves and drive the ring home till its exposed radial face is flush with the end face of the shuttle-body. The ring will be formed of such size as to leave between itself and the axial socket a considerable annular body of fiber, in which the stem of the metal tips embeds itself when driven home in the socket.

My improved form of reinforcing-ring is shown in the accompanying drawings, in which—

Figure 2:
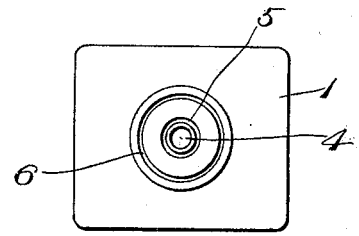
Figure 3:
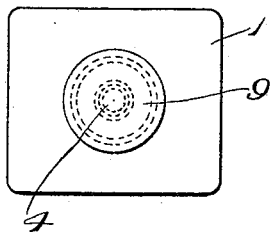
Figure 4:
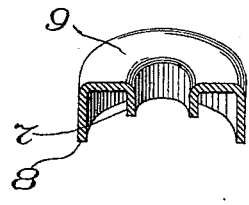

Figure 1 is an axial section of one extremity of a shuttle having my invention applied thereto. Fig. 2 is an end view of the shuttle-body, showing it prepared to receive the ring and metallic tip. Fig. 3 is a similar view of the same with the double reinforcing-ring introduced. Fig. 4 is a perspective view of an axial section of the ring.

1 is the shuttle-body.

2 is the tip, having the stem 3, both being of the usual form, &c. The said stem fits the central or axial socket 4 in the end of the shuttle-body. In Fig. 2, 5 and 6 are the inner and outer grooves, which are formed concentric with the socket 4. The reinforcing-ring is made up of the inner flange 7, the outer flange 8, and the intermediate annular connecting portion 9.

10 designates the ring or shell of wood that is left between the inner groove 5 and the axial socket 4.

I am enabled to form my reinforcing-ring, if I prefer, by striking the same up from a blank of sheet metal, and hence can produce it cheaply, while it is susceptible of being made lighter and at the same time will be stronger than the old form of ring hereinbefore described. By its use I prevent a large proportion of the injuries that with the old form of ring would occur to the shuttle, thereby frequently saving the cost of a new shuttle if not also serious damage to the warp-yarns from the flight of a splintered shuttle through the shed.

What I claim is—

The combination with a shuttle-body having in the end thereof an axial socket and two concentric grooves surrounding the said socket and separated therefrom by a cylindrical portion of the fiber of the shuttle-body, and a tip having a stem entered into the said socket, of the reinforcing-ring having the two cylindrical flanges occupying the aforesaid concentric grooves in the shuttle-body, substantially as described.

In testimony whereof I affix my signature in presence of two witnesses.

STEPHEN M. HAMBLIN.

Witnesses:
HUGH F. HARRISON,
EARL L. WILSON.